United States Patent
Compliment et al.

(10) Patent No.: US 6,360,260 B1
(45) Date of Patent: *Mar. 19, 2002

(54) DISCOVERY FEATURES FOR SNMP MANAGED DEVICES

(75) Inventors: Dale Richard Compliment; Thomas Joseph Prorock, both of Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/274,549

(22) Filed: Mar. 23, 1999

Related U.S. Application Data

(63) Continuation of application No. 08/749,476, filed on Nov. 12, 1996, now Pat. No. 5,909,549.

(51) Int. Cl.[7] ............................................... G06F 15/16
(52) U.S. Cl. ....................................... 709/224; 709/223
(58) Field of Search ................................ 709/223–224, 709/226; 370/254–255; 714/47

(56) References Cited

U.S. PATENT DOCUMENTS

| | | | |
|---|---|---|---|
| 4,914,571 A | | 4/1990 | Baratz et al. .................. 707/10 |
| 4,941,084 A | * | 7/1990 | Terada ......................... 709/104 |
| 4,991,089 A | | 2/1991 | Shorter ........................ 709/220 |
| 4,995,035 A | * | 2/1991 | Cole et al. ................... 370/254 |
| 5,185,860 A | | 2/1993 | Wu ............................. 709/224 |
| 5,233,510 A | | 8/1993 | Brueckner et al. ............. 700/2 |
| 5,282,270 A | | 1/1994 | Oppenheimer et al. ..... 709/223 |
| 5,321,812 A | * | 6/1994 | Benedict et al. ............ 370/249 |
| 5,367,635 A | * | 11/1994 | Bauer et al. ................ 709/221 |
| 5,408,618 A | | 4/1995 | Aho et al. ................... 710/104 |
| 5,561,769 A | * | 10/1996 | Kumar et al. ............... 709/202 |
| 5,574,860 A | * | 11/1996 | Perlman et al. ............. 709/220 |
| 5,596,723 A | * | 1/1997 | Romohr ....................... 709/222 |
| 5,651,006 A | * | 7/1997 | Fujino et al. ................ 370/408 |
| 5,659,543 A | * | 8/1997 | Ater et al. ................... 370/258 |
| 5,668,952 A | * | 9/1997 | Slane .......................... 709/245 |
| 5,706,440 A | * | 1/1998 | Compliment et al. ....... 709/224 |
| 5,710,885 A | * | 1/1998 | Bondi ......................... 709/224 |
| 5,835,720 A | * | 11/1998 | Nelson et al. .............. 709/224 |
| 5,875,306 A | * | 2/1999 | Bereiter ...................... 709/230 |
| 5,896,503 A | * | 4/1999 | Badovinatz et al. ........ 709/201 |
| 5,909,549 A | * | 6/1999 | Compliment et al. ....... 709/223 |
| 5,926,619 A | * | 7/1999 | Badovinatz et al. ........... 714/4 |
| 5,968,116 A | * | 10/1999 | Day, II et al. .............. 709/202 |
| 5,996,001 A | * | 11/1999 | Quarles et al. ............. 709/203 |
| 6,047,330 A | * | 4/2000 | Stracke, Jr. et al. ........ 709/238 |
| 6,125,390 A | * | 9/2000 | Touboul ...................... 709/203 |

FOREIGN PATENT DOCUMENTS

JP    3123137    5/1991   ........... H04L/12/28

OTHER PUBLICATIONS

Stevens, W., TCP/IP Illustrated, vol. 1, Addison–Wesley, Ch. 25, pp. 359–288, 1994.*

* cited by examiner

*Primary Examiner*—Zarni Maung
*Assistant Examiner*—Andrew Caldwell
(74) *Attorney, Agent, or Firm*—Joscelyn G. Cockburn

(57) ABSTRACT

Apparatus and method which allow an SNMP managed device to register with a Network Management system. The SNMP managed device generates and transmits, to the Management Station or other network stations, a Frame indicating that the managed device is present in the network. The process of transmitting the frame continues until the Management Station responds with a frame acknowledging receipt. The managed device then sets a Timer and monitors for receipt of the Response frame from said Management Station. If the timer expires and the Response frame is not received within the timer interval, the registration process is initiated. Thus, the invention discloses a dynamic way of registering, monitoring and initiating registration (if contact is lost) of an SNMP device with a Management Station.

27 Claims, 11 Drawing Sheets

Format of the
Management Table

| Management Station Field | Connection State Field | | Table Time Field | Connect Time Field |
|---|---|---|---|---|
| | T | F | | |
| | | | | |
| | | | | |
| | | | | |
| | | | | |
| | | | | |
| | | | | |

FIG. 7

| Preamble | DA | SA | 0800 | IP and TCP Headers | Data | FCS |

Frame Format

DA = Destination Address
SA = Source Address
FCS = Frame Check Sequence

FIG. 8

Management System

DISCOVERY FEATURES FOR SNMP MANAGED DEVICES

This is a continuation of application Ser. No. 08/749,476 filed on Nov. 12, 1996, now U.S. Pat. No. 5,909,549.

BACKGROUND OF THE INVENTION

1. Field of the Invention

The invention relates to network management in general, and in particular, to discovering the location of Management Stations and managed devices in the network.

2. Prior Art

The proliferation of computer networks has created a demand for improved apparatus and method for managing such networks. The management need is even greater because the networks are growing larger and more complex. Most conventional computer networks are comprised of stations (for example, word processors, personal computers, etc.) interconnected by communications infrastructure. Included in the communications infrastructure are routers, bridges, transmission media, gateways, switches, etc. The computer networks could be simple ones in which the stations are configured in a room, or a more elaborate ones in which the stations are distributed over a large geographical area, such as a large building, company site, a campus or several towns.

In more complex networks, one or more of the stations are designated Management Stations. One of the functions provided by Management Stations is keeping track of devices (called managed devices) as they (the managed devices) enter and/or leave the network. To provide tracking and other management functions, a Management Program, such as the Simple Network Management Protocol SNMP is executed in the Management Station and in the managed device. The portion of SNMP which is executed in the managed device is termed SNMP agent. Usually, the activities of managed devices are maintained in a data base (file) at the Management Station and can be used by the Management Station itself or a network operator to detect and/or correct fault in the network.

The conventional approach, to network management, addresses SNMP Management Stations and the SNMP managed devices operating at the LLC level of the protocol stack. The conventional technique uses an appropriate protocol, such as the well-known Internet Protocol (IP), to communicate and to "auto-discover" the SNMP managed devices or devices. Even though the approach works well for discovering LLC level devices, there are other network devices, termed MAC layer devices, which do not respond very well to LLC level protocols. The MAC (Medium Access Control) layer devices may include routers, concentrators, hubs, switches or like devices. As a consequence, these MAC layer devices are usually not discovered, by the Management Stations, using the conventional approach.

Several prior art patents describe devices and method for managing computer networks. The following patents are examples of the prior art devices and methods.

U.S. Pat. No. 5,233,510 describes a method of continuously self-configuring of a computer control system used in a manufacturing process. Each object in the process is assigned a unique ID or address. Each object in the manufacturing process uses its unique ID in all communications with other objects in the process. With this information, a control computer can locate and map all of the objects that are in the process.

Japanese patent number JP-3-123137 deals with the manual configuration of a MAC address into the forwarding table of a MAC layer bridge and storing these addresses into an NVRAM. Most MAC layer bridges "listen" to the MAC addresses on either side of the bridge and dynamically build forwarding tables. This patent provides a way to manually build this table eliminating the need for the bridge to "learn" the addresses.

U.S. Pat. No. 5,282,270 deals with the discovery of network devices that exists in a network running the Apple-Talk protocol. The patent defines how routers within the AppleTalk protocol determine the location of the network element. The patent uses a multicast address which all routers running the AppleTalk recognize. The information passed between routers in these multicast frames is used to locate network elements.

U.S. Pat. No. 4,991,089 deals exclusively with workstations attached to a SNA network using the LU6.2 specification. The patent defines the method where the workstation notifies a host system of its terminal address via the SNA protocol.

U.S. Pat. No. 4,914,571 describes a method for locating resources in a computer network so that a session can be established between an origin and a destination station. The patent relates specifically with the SNA protocol. The LOCATE METHOD defined in the patent uses the SNA protocol to search for the destination target.

U.S. Pat. No. 5,408,618 discloses an Automatic Configuration Mechanism (ACM) which can be used by a node in a LAN to obtain configuration information from other nodes, to provide configuration information to other nodes and to respond to other nodes which seek configuration information. The frame format of this patent operates at the LLC layer of the ISO protocol stack.

U.S. Pat. No. 5,185,860 describes a method by which a Network Management Station (NMS) can "auto" discover devices containing SNMP agents in a network using TCP/IP protocol. Of all the above cited prior art, this patent appears most relevant to the field in which applicants' invention operates. However, it covers the discovery process as it relates to the Management Station only and does not address discovery as it applies to an agent. As networks become more complex and dynamic, addition and relocation of devices are likely to occur more frequently. As a consequence, new procedures and devices are required to "auto" discover changes in the network.

SUMMARY OF THE INVENTION

It is, therefore, an object of the invention to provide a more efficient and comprehensive "auto" discovery process than was heretofore been possible.

It is another object of the invention to provide the "auto" discovery process in devices to make their discovery more likely, by a Network Management System (NMS).

It is still another object of the invention to provide the "auto" discovery process in a network using TCP/IP Protocol to communicate and SNMP protocol to manage the network.

These and other objects are achieved by enabling a managed device to send special "auto" discovery frames to a Network Management Station or an intermediate station, such as a router, until the managed device is discovered. Thereafter, the device then monitors communications between itself and the Management Station and restarts the registration process if communication is lost or impaired. As a consequence, discovery of SNMP devices and continued knowledge of the whereabouts of the SNMP devices are ensured.

More particularly, a device on receiving a frame termed GET REQUEST FRAME (described below) from a Network Management Station, sets a "Watch Dog" timer. The Watch Dog timer is used to start a registration process if contact is lost with the Network Management Station. Lost contact is determined when an SNMP GET REQUEST FRAME has not been received from the Management Station during the "Watch Dog" timer interval.

In the case where the Watch Dog timer expires, and an SNMP GET REQUEST Frame has not been received during the Watch Dog interval, the Registration Process is restarted. Two Registration Processes, termed Auto-Discovery Trap and Router ARP Cache, are described.

In the Auto-Discovery Trap, the device sends Auto-Discovery Trap Frames at timed intervals selected by a user. The Auto-discovery Trap Frames contain Enterprise specific information (e.g., identifying the device as a hub, switch, etc.) about the managed device. The Trap Frames are sent to a Network Management Station until an SNMP GET REQUEST Frame is received. The reception of SNMP GET REQUEST Frame indicates that the device has been discovered by the Network Management Station.

In the case where the Watch Dog timer expires, and an SNMP frame has not been received during the "Watch Dog" timer interval, then the process is started again with the sending of the Auto-Discovery Trap.

In the Router ARP Cache process, the managed device sends frames termed "Ping Frames" to an address for a default router. When the default router receives the ping frames, it places the address of the device in its ARP cache. The Network Management Station obtains the ARP cache information from the router and uses the information to "discover" the device. The device sends the ping frames until an SNMP GET RESPONSE Frame is received indicating that the device has been discovered by the Management Station. Once an SNMP GET RESPONSE Frame is received, a "watchdog" timer is set at the user configured interval. The Watch Dog timer is used to start the process over again if contact is lost with the Network Management Station. Lost contact is determined when an SNMP GET REQUEST Frame has not been received from the Management Station during the "watch dog" timer interval.

In the case where the watch dog timer expires, and an SNMP frame has not been received during the "watch dog" timer interval, then the process is started again with the sending of the ping frames.

The invention also includes a novel way to set the "Watch Dog" timer dynamically. One of the many advantages of the invention is that it ensures discoverability regardless of network configuration. Another one of the many advantages of the invention is that continued contact between managed devices and Management Stations are maintained.

Still another one of the many advantages of the present invention is that if contact is lost between Management Stations and managed devices, a re-registration process is initiated automatically. Consequently, operator intervention is not required.

BRIEF DESCRIPTION OF THE DRAWINGS

FIG. 7 shows the structure of the Management Table according to the teachings of the present invention.

FIG. 8 shows graphical representations for frames used in the present invention.

DETAILED DESCRIPTION OF THE PREFERRED EMBODIMENT

Before describing the details of the invention, the environment in which the invention will be described is worthwhile discussing. In addition, certain words of art as they apply to the environment will also be defined in the hope that it will enhance understanding of the invention.

The present invention can be used in any communications network in which connection between a Management Station and a managed device is to be established.

The present invention, described herein, works well in a network utilizing the TCP/IP (Transmission Control Protocol/Internet Protocol) communications protocol and SNMP Simple Network Management Protocol and as such will be described in this environment. However, this should not be construed as a limitation on the scope of the present invention. Since it is within the skill of one skilled in the art to use the invention in other environments without deviating from the scope or spirit of the present invention.

DEFINITIONS

ARP (Address Resolution Protocol)allows a station to find the physical address of another station given the IP address.
IP means Internet Protocol.
ARP Cache means a memory mapping of IP-to-physical address kept by all stations which use ARP.
TCP means Transmission Control Protocol.
TCP/IP is a standard transport level protocol that provides reliable, full duplex stream service.
SNMP means Simple Network Management Protocol.
Managed Devices can be primarily defined as network interconnect devices such as hubs, switches, bridges and routers. It could also include workstations.
A more extensive discussion on TCP/IP, SNMP, etc. are set forth in *InternetWorking with TCP/IP*, Volume 1, Principals, Protocols and Architecture by Douglas E. Comer, and RFC 1157—*The SNMP Protocol (Version 1) Specification*. The cited literature can be reviewed for more background information on the environment in which the present invention is implemented and to the extent necessary are incorporated herein by reference.

Figure 1:
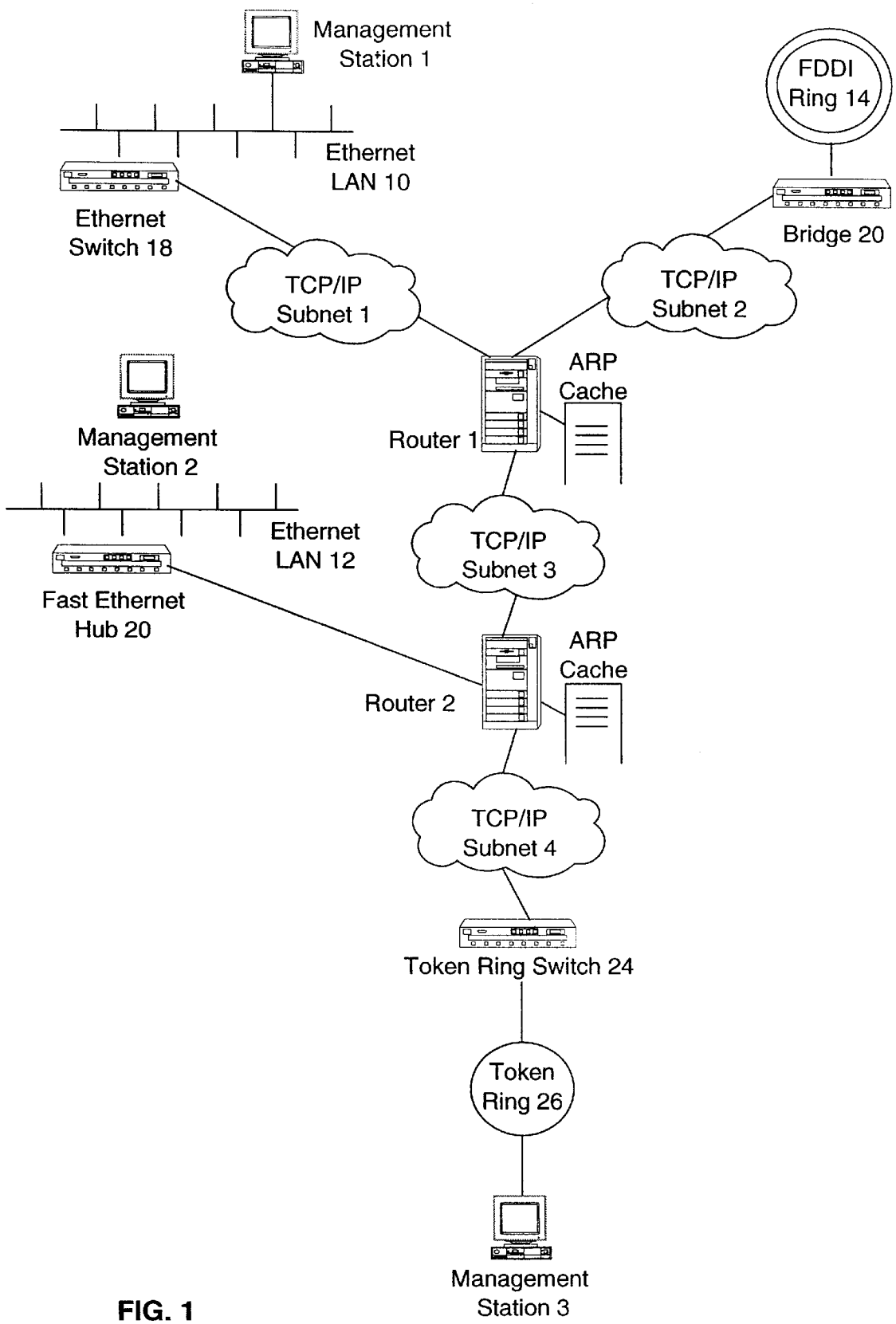
FIG. 1 shows a network in which the present invention can be used.

FIG. 1 shows a block diagram of the communications network in which the present invention could be implemented. The network includes Ethernet LANs 10, 12, FDDI Ring 14, Token Ring 26,. Router 1, Router 2, and TCP/IP Subnets 1, 2, 3 and 4. The Router 1 is connected through the TCP/IP Subnet 1 to Ethernet Switch 18 which is connected to Ethernet LAN 10. Management Station 1 is also connected to Ethernet LAN 10. Bridge 20 is connected to FDDI Ring 14. Bridge 20 and Router 1 are connected by TCP/IP Subnet 2. The Router 1 is connected by TCP/IP subnet 3 to Router 2. The Router 2 is connected to Fast Ethernet Hub 20 which is connected to Ethernet LAN 12. Management Station 2 is also connected to Ethernet LAN 12.

Still referring to FIG. 1, Router 2 is connected through TCP/IP Subnet 4 to Token Ring Switch 24 which is connected to Token Ring 26. Management Station 3 is also connected to the Token Ring 26. Preferably, the managed devices include the Ethernet Switches, Token Ring Switch 24, Router 1 and Router 2 and Bridge 20. Each of the Routers 1 and 2 is fitted with a ARP Cache. As described above, each of the ARP Cache is storage, located in the Router, which stores information that a Management Station can recall and detect the location of managed devices in the network. Consequently, the Management Table (described below) in each managed device has an entry for the three Management Stations. If the management feature in each of the managed devices is enabled, Router 1 has ARP Cache entries for Ethernet Switch 18 and FDDI Ring 14. Similarly, Router 2 has ARP Cache entries for the Token Ring Switch 24 and the Fast Ethernet Hub 20. It should be noted that in an actual system, the ARP Cache is located in the associated Router and not externally as shown in FIG. 1.

The invention (details set forth below) establishes and maintains contact between Management Stations and managed devices. To this end, a portion of SNMP management program is executed on the Management Stations and another portion termed SNMP agent, is executed on the managed devices.

The Management Stations then discover all of the managed devices by querying the ARP Caches of each of the routers. As described below, when the discovery trap feature is enable, all of the managed devices send SNMP traps (frames) to the Management Stations that are defined in their Management Tables. The Auto Discovery TRAP (details set forth below) is also used to establish contact between Management Stations and managed devices. As a result, the Management Stations learn/discover the managed devices. Once the managed devices are discovered, the Management Stations start to poll the managed devices on a periodic basis to maintain a connection with the managed device. In the event that a connection with one of the Management Stations is lost, the ARP Cache feature (pings) or the discovery trap starts and runs until the connection is re-established. Thus, the present invention allows the discovery of managed devices and maintenance of the connection so long as the managed device and/or the Management Station is active in the network.

Figure 2:
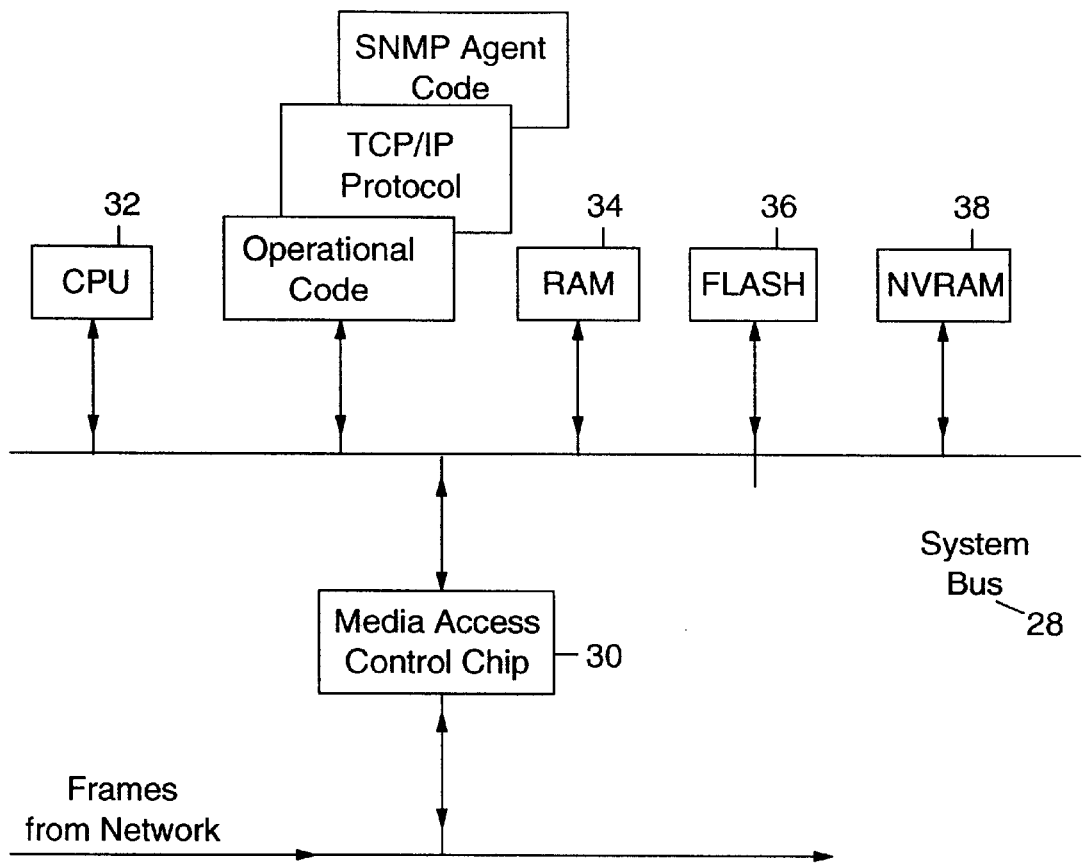
FIG. 2 shows a block diagram of a device in which the "auto" discovery invention according to the teachings of the present invention are embedded.

FIG. 2 shows a functional configuration for an SNMP managed Device. The SNMP managed device includes a System Bus 28, Media Access Control Chip 30, CPU 32, RAM 34, Flash Memory 36, and NVRAM 38. A managed device is an embedded system in which the system bus provides communication between the above-named components. The RAM forms the working memory of the device. The NVRAM stores configuration information. Similarly, the FLASH EMPROM 36 stores the operational and boot-up code. The processor or CPU executes the code instructions. The Media Access Control Chip 30 connects the device to the network. In most cases, the operational code and the frame processing code execute in the Flash Memory or in the RAM. Even though the TCP/IP protocol stack and the SNMP agent and operational code are shown as separate agents connected to the System Bus 28, this is done for emphasis only. In actuality, the operational code and frame processing code are in the RAM or the FLASH EPROM. The discovery code of the present invention operates as part of the operational code (microcode or firmware) of the embedded device.

The SNMP Network Management frames (described below) and ping frames are received via MAC Chip 30. The MAC chip copies the frames into RAM 34 and then notifies the processor (usually via interrupt) that a frame is ready for processing. At this point, the operational code gets control and processing starts with step 200 (FIG. 5).

Turning to FIG. 8 for the moment, a graphical representation of the general format for an ethernet frame is shown. The frame can be used to transport information according to the teachings of the present invention. The frame includes the following fields: Preamble, Destination Address (DA), Source Address (SA), ethernet type (0800), IP and TCP headers, Data and Frame Check Sequence (FCS). The SNMP Requests, SNMP Responses, SNMP Traps and ICMP Ping Frames are coded in the IP and TCP header field of the frame. The functions of the other fields and. the information that goes into them are so well known that further descriptions are not warranted. In addition, other frame formats, such as IEEE 802.3 or IEEE 802.5 (Token Ring), are well known and further description of such well known formats will not be given.

Figure 9:
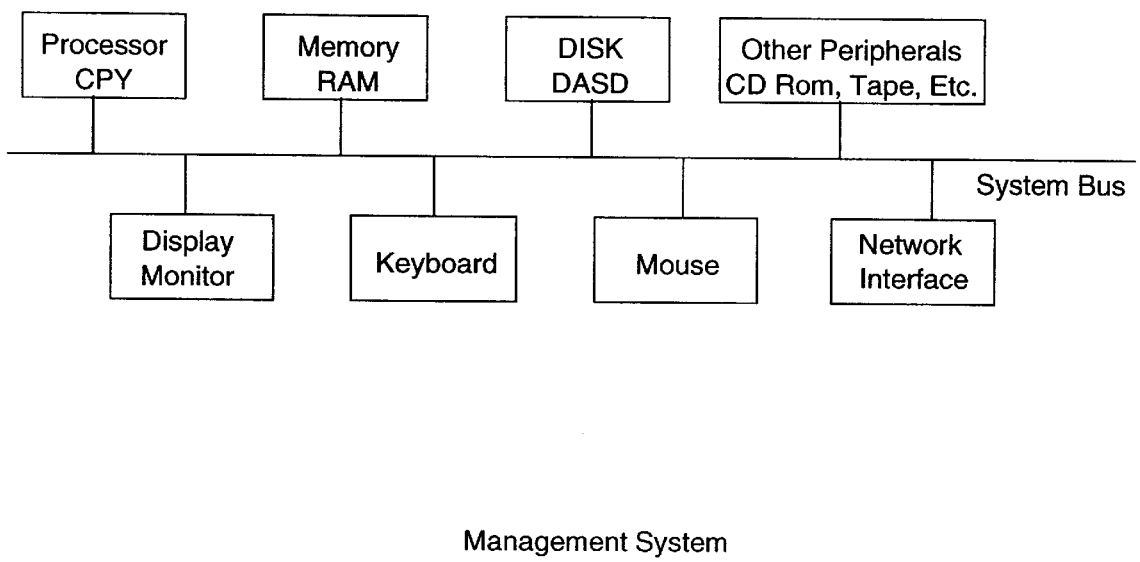
FIG. 9 shows a functional representation of the Management Station.

A functional block diagram for the Management Station is shown in FIG. 9. The Management Station manages the network and uses the management frames to exchange information with the managed devices. Likewise, the managed devices use the frames set forth above to communicate with the Management Station. The Management Station executes the management portion of SNMP protocol. The Management Station includes a Processor (CPU) with a bus to which memory RAM, Disk (DASD), other peripherals (CDROM, tape, etc.), display monitor, keyboard, mouse and network interface card are connected. The structure of the Management Station is conventional and further description is not warranted.

Figure 5:
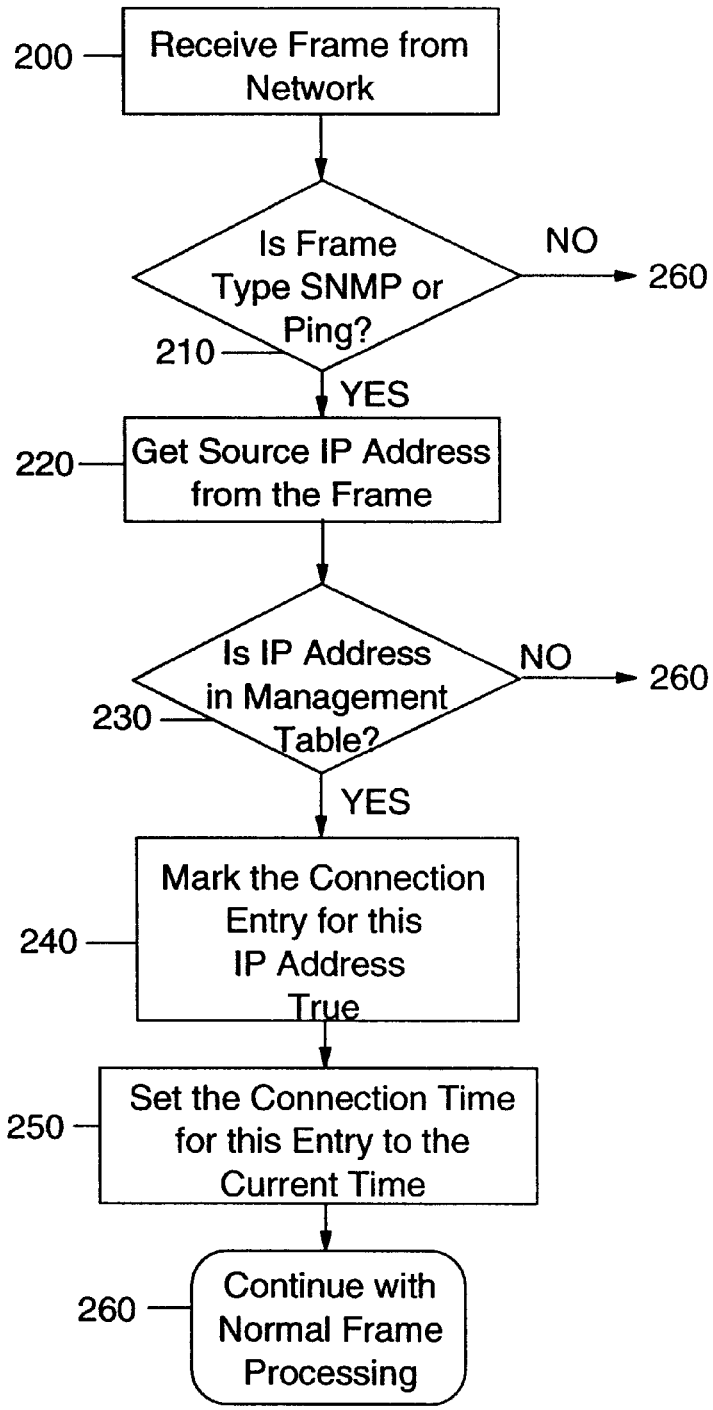
FIG. 5 shows a flowchart of the device processing a frame received from the network.

FIG. 5 shows,a flowchart illustrating the processing that occurs in the managed device after it receives the frame from the network. After the frame is received from the network (step 200), the program descends into decisional block 210. In decisional block 210, the program tests to see if the frame type of the received frame is an SNMP frame or a ping frame (ICMP echo request). If the result is yes, the program descends into block 220. If the received frame is of some other type, the processing is continued in block 260. It should be noted that the Management Station uses SNMP frames and/or Ping frames to communicate with managed devices.

Still referring to FIG. 5 and in particular, step 220, if the frame is an SNMP or Ping frame, the program gets the source IP address from the frame. The program then descends into decisional block 230 where it compares the source IP address from the received frame to the entries in the Management Table (to be described subsequently). If there is a match, the program continues processing in step 240. If there is no match between the source address from the received frame and an entry in the Management Table, the program continues processing in step 260. It should be noted that step 260 indicates continuation of normal frame processing which is not part of the present invention and further description of normal frame processing is not discussed in this application. With respect to step 240 and step 250 for the entry in the Management Table where the Source IP Address from the received frame matches the Management Station address, the entry is updated as follows: Set the connection state to True and set the connection time to the current time and processing is continued in 260.

Turning to FIG. 7 for the moment, the format of the Management Table in a managed device is shown. The Management Table includes a Management Station field, a Connection State field, a Table Time field, and a Connect Time field. The Management Station field contains the IP address of the Management Station that will manage this device. As shown by the blank entries in the figure, multiple Management Stations can manage a single managed device. It should also be noted that this Management Table is a storage embedded in the managed device.

The Connection State field has a True column (T) and a False column (F). The Connection State field contains the connection information of the station relative to the Management Station. If the values of the Connection State are true, the Management Station for this entry in the Management Table has established a connection with this device. As used herein, this device refers to the device that has the Management Station IP address in it. If the state of the Management Station is false, the Management Station for this entry in the Management Table has not established a connection with the device.

The Table Time field contains the value of the current time when the table entries were last updated.

The Connect Time field contains the current time when the connection between the Management Station and the managed device has been established.

As will be described subsequently, the Management Table is built initially at the time the device is first configured. During this configuration, the user identifies the Management Station that will be managing the managed device. Once these configurables have been established, the Management Table can be updated, after the initial configuration, via Management Frames using Telnet or local console. For updating with Management frames, the Management Station can add/or delete entries in the Management Table via an SNMP Management frame. To update via Telnet, the Telnet interface into the managed device can change configuration parameters. Entries in the Management table can be added and/or deleted via a Telnet session. Finally, changes to the Management Table can be made via a local console over an RS232 serial port which is usually connected to the managed device. The local console can be used to change configuration parameters in the device. Entries in the Management Table could be added and/or deleted via a local session.

Figure 3A:
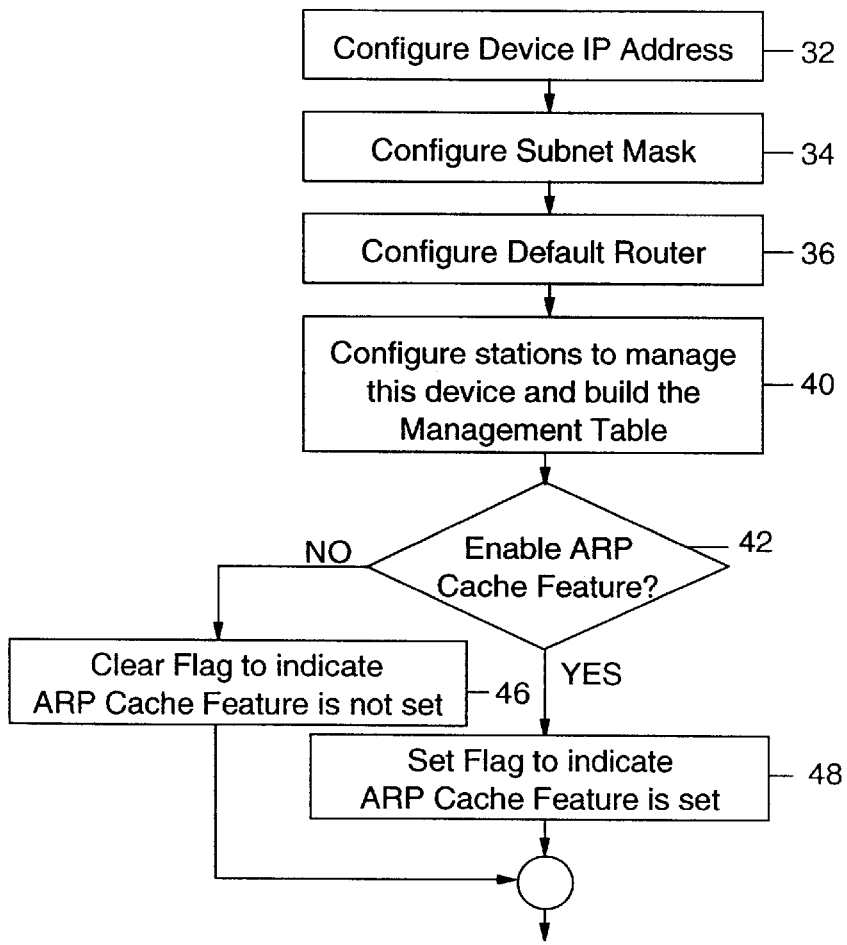
FIG. 3, consisting of FIG. 3A and FIG. 3B, shows a flow chart for configuring the device of FIG. 2.
Figure 3A:
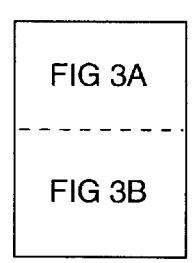
Figure 3B:
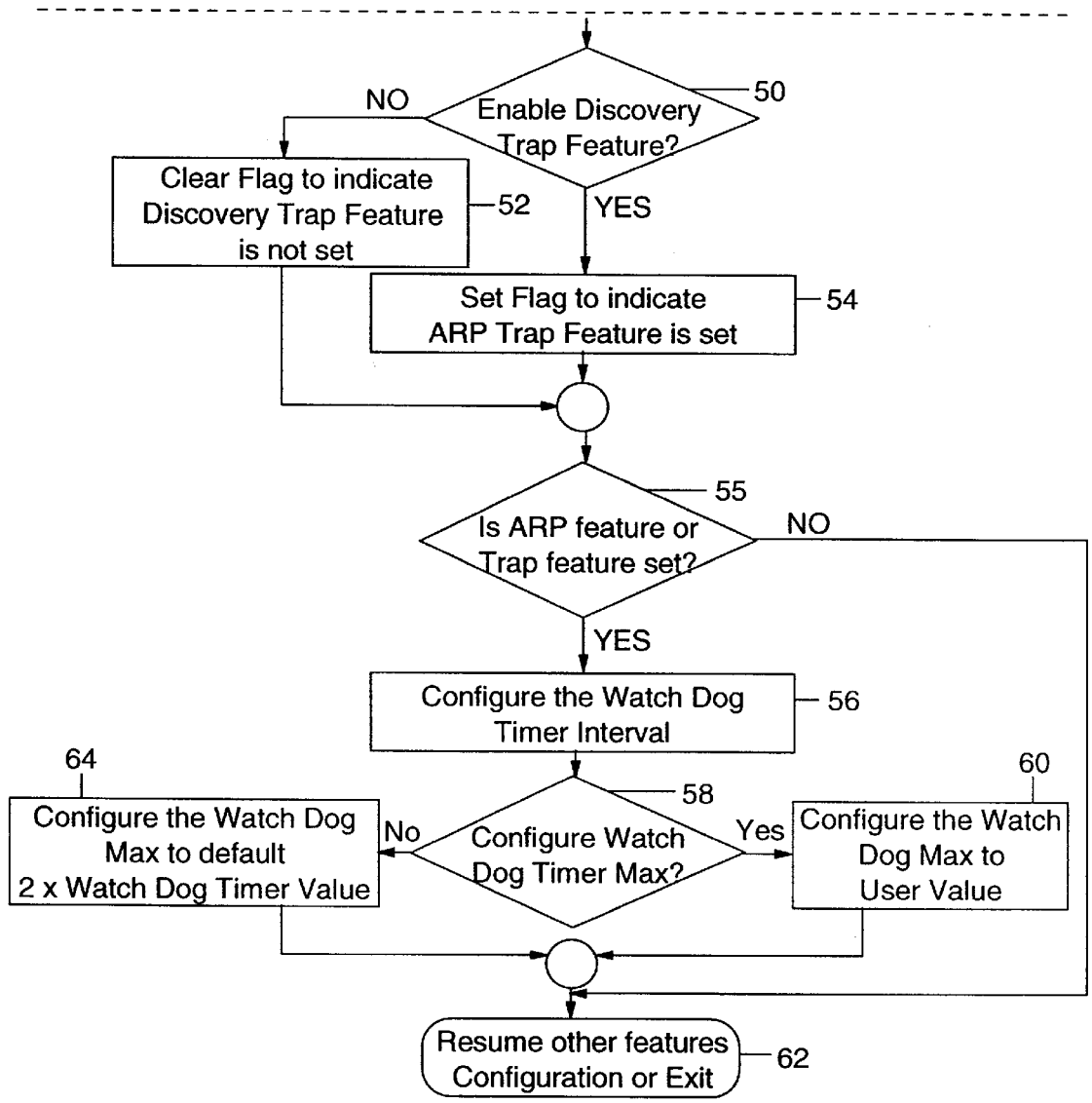

FIG. 3 shows a flowchart defining the information that is initially configured into the SNMP managed device. Usually, the information is installed in the managed device before it is deployed into a network. In steps 32, 34 and 36, the device is configured with the IP address, Subnet Mask, and Default Router. In step 40, the Management Stations to manage this device are built in the Management Table previously described.

The IP address, the Default Router Address and Subnet Mask are required information for devices that are to be managed in TCP/IP networks. This information is common among all SNMP managed devices that ship today. Also, common among devices initial configurations is to specify which Management Station(s) will manage the device. As discussed above, these management station addresses are entered in the Management Table of the device.

In addition to the basic requirements defined above, this invention requires the following information to be configured initially into the managed device. It should be noted that the additional requirements are required for the invention to start working immediately in a network. However, these functions could be enabled/disabled later via management frames, Telnet or via the devices' local console as described above. Notwithstanding, to realize the full impact of the invention, it is recommended that this information be configured at the same time the device is initially configured.

Watch Dog Timer Interval—this timer interval specifies the time to dispatch the discovery feature task that is specified in this invention and is described below. The value correlates to the poll period used by the Management Stations. This value should be set to the longest poll interval from the list of management stations (plus a buffer of up to 60 seconds to account for network and/or processing delays).

Watch Dog Timer Maximum Value—this timer interval is the upper bound that can be used for the Watch Dog timer interval. An important feature of this invention is that it automatically adjusts the value of the Watch Dog timer interval based on actual responses received from the Management Station. This maximum value is required to handle the case where a Management Station has been defined in the device, but for some reason never establishes a connection with a device. Without the maximum value, the Watch Dog timer interval would grow infinitely large to try and accommodate this Management Station. The maximum value prevents this from happening. The safe value for the maximum is two times the size of the initial Watch Dog timer that was set in the previous step.

ARP Cache Feature—this configuration option simply allows a customer to enable or disable this feature of the invention. It is recommended to be enabled for TCP/IP networks that have routers installed.

Discovery Trap Feature—this configuration option simply allows the customer to enable or disable this feature of the invention. It is recommended to be enabled for networks that do not have routers installed.

Finally, for networks including Routers and other types of interconnecting devices, the ARP Cache Feature and the Discovery Trap Feature should be activated.

Still referring to FIG. 3, once the station or stations to manage this device is configured in the Management Table (step 40), the program descends into decisional block 42. In decisional block 42, the program tests to see if the ARP Cache feature is enabled. If it is not enabled, the program descends into block 46 where it clears the flag indicating that the ARP Cache feature is not set. If the ARP Cache feature is enabled, the program descends into block 48 where it sets flags indicating that the ARP Cache feature is functional. From blocks 46 or 48, the program descends into decisional block 50 where it tests to see if the enable discovery trap feature is set. Depending on whether it is set or not set, the program descends through block 52 or 54 respectively into block 55 where the program checks to see if the ARP feature or Trap feature is set. If either one is set, the program descends into block 56. In block 56, the Watch Dog Timer Interval is configured and the program descends into decisional block 58. If in block 58 the decision is yes, the program enters block 60 where the Watch Dog Timer Value is configured to maximum user value. The program then descends into block 62 where it exits or continues to configure other features of the device. If in block 58 the decision is no, the program enters block 64 in which it configures the maximum Watch Dog Value to a default value of 2×Watch Dog Timer Value and descends into block 62 where it either exits or continues to configure other features of the device. The program also descends into block 62 if neither the ARP feature nor the Trap feature is set (block 55).

Figure 4A:
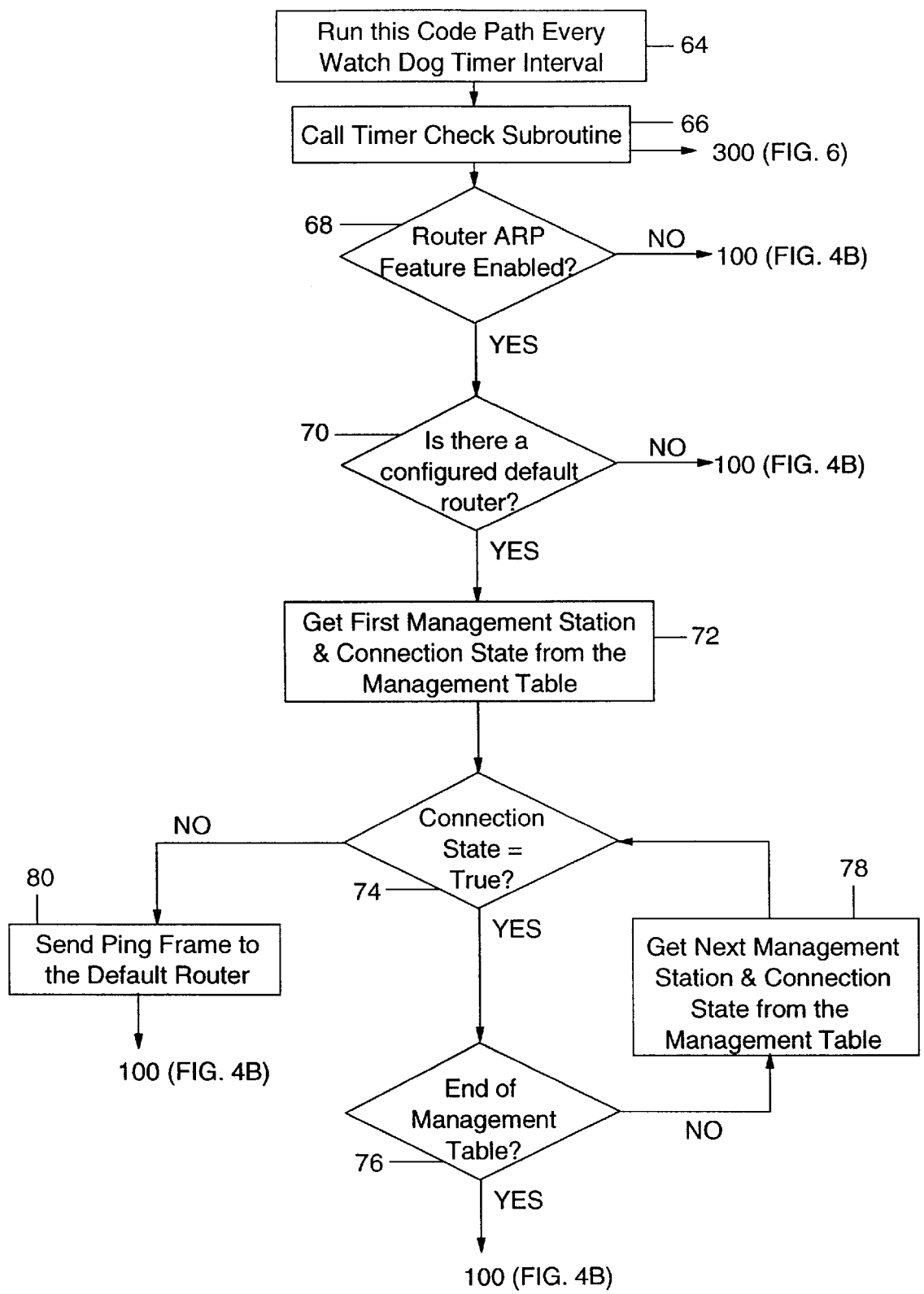
FIGS. 4A and 4B show flowcharts for a program implementing the auto discovery features of the present invention.
Figure 4B:
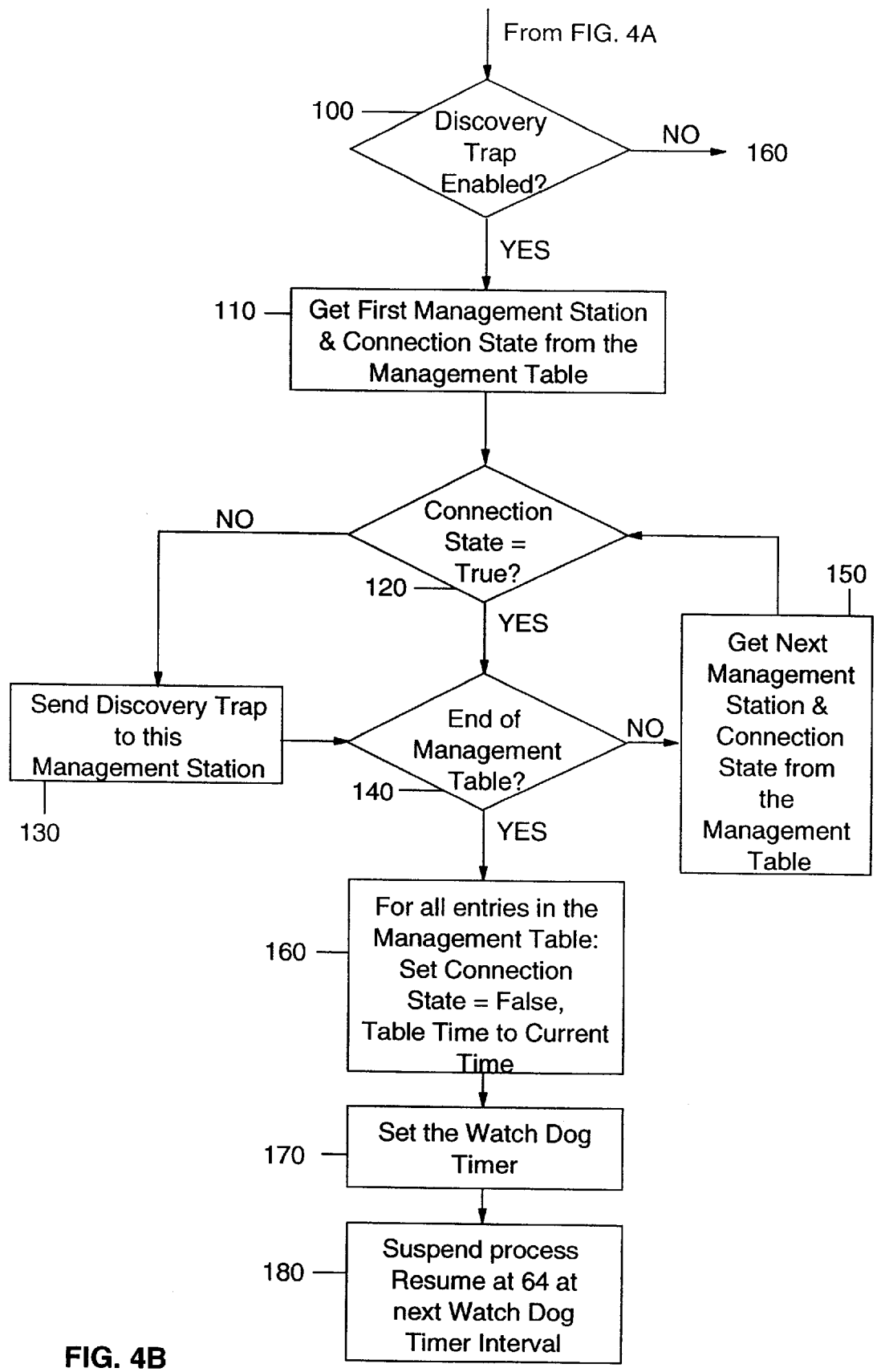
Figure 6:
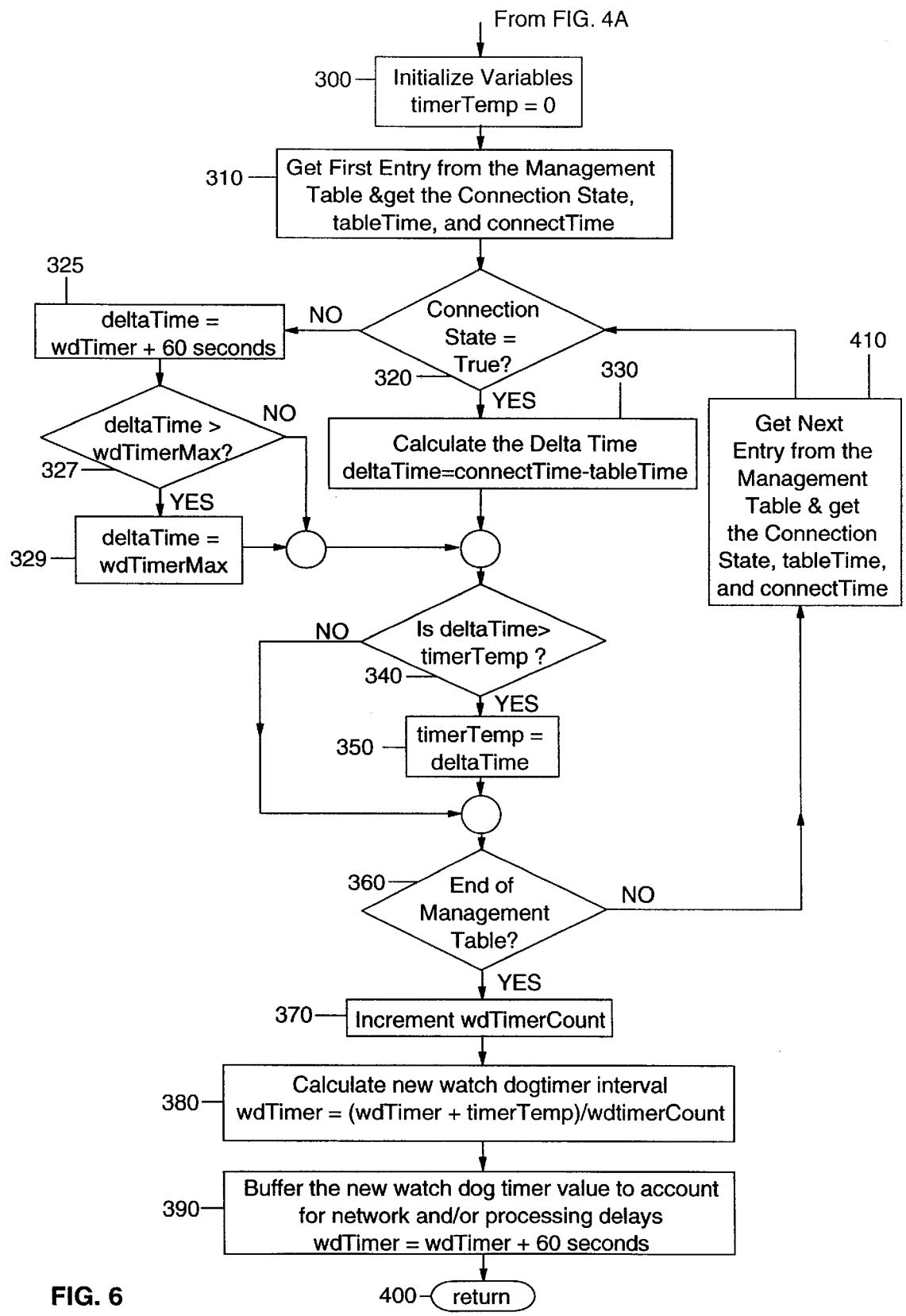
FIG. 6 shows a flowchart for setting the "Watch Dog" timer dynamically.

FIG. 4A shows a flowchart for implementing the Router ARP Cache Discovery feature according to the teachings of the present invention. The code operates in the managed device and is executed at the timer interval that is configured for the Watch Dog Timer. The flowchart defines the process which takes place during the dispatch of the discovery feature task. Block 64 indicates the entry point of the code where the code path is run every watch dog timer interval. The program then descends into the Call timer check Subroutine (block 66). This subroutine dynamically configures the timer by calculating the new value for the watch dog timer. The subroutine begins in block 300 (FIG. 6, to be described subsequently). The program then descends into decisional block 68 where a check is made to determine if the Router ARP Cache feature is enabled. If the Router ARP feature is not enabled, processing is continued at block 100 (FIG. 4B). It should be noted that FIG. 4B (beginning with block 100) describes the other discovery procedure known as auto-discovery trap process to be described subsequently.

Still referring to FIG. 4A, if the Router ARP feature is enabled (block 68), the program descends into block 70. In block 70 a determination is made if a default router has been configured. If no default router has been configured, then there is no point in proceeding with this part of the invention since the Router ARP feature requirement needs to know the default router address to send the Ping frames. When no default router is configured, processing is continued in block 100 (FIG. 4B). As stated previously, the routine in FIG. 4B uses the discovery trap feature for the discovery process. If a default router has been configured, processing continues to block 72. In block 72, the program retrieves the first entry from the Management Table and gets the address of the Management Station and the connection state. The Management Table gets initialized during the initial configuration of the managed device, as previously described. The program then descends into decisional block 74 where it checks the connection state of the Management Station. If the connection state is true, this indicates that a connection was made by the Management Station during the watch dog timer interval, and processing continues in block 76. In block 76, the program checks to see if this is the end (i.e. last entry) of the Management Table. If it is, the program then goes to block 100 (FIG. 4B). If additional entry is in the Management Table, the program goes to block 78 where it retrieves the Management Station and Connection States from the Management Table and completes the process set forth in steps 74 and 80.

Still referring to block 74, if the connection state is false, the program descends into block 80 where it sends a Ping frame to the default router and proceeds to block 100 (FIG. 4B).

FIG. 4B shows a flowchart for the discovery trap discover process. Entry into the procedure is via decisional block 100 and from FIG. 4A. In decisional block 100, a check is made to determine if the discovery trap feature is enabled. If the discovery trap feature is not enabled, processing continues to step 160. If the discovery trap feature is enabled, the program descends into block 110 where it retrieves the first entry from the Management Table and gets the address of the Management Station and the connection state. The program then descends into decisional block 120 where it checks to see the state of the connection. If the connection state is true, this indicates that a connection was made by the Management Station during the watch dog timer interval and processing continues to block 140. If the connection state is false, then this indicates that the connection with the Management Station was lost/broken during the last watch dog timer interval and processing continues to block 130. In block 130, the program sends a "discovery trap frame" to the address of the Management Station in the current entry of the Management Table. The program then goes to block 140 where a check to see if all the entries in the Management Table have been processed is made. If all the entries in the Management Table have not been processed, the program goes into a loop into block 150 where it processes the next entry in the Management Table and to block 120 or block 130 back to block 140. If there are no more entries to process in the Management Table, the program descends into block 160. In block 160 the program resets all entries in the Management Table as follows: Connection State to false and the Table Time to current time and continues processing in block 170 by setting the watch dog timer and descends into block 180 where the discovery feature process is suspended and resumes processing at step 64 (FIG. 4A) when the current watch dog timer expires.

FIG. 6 illustrates the process for setting the watch dog timer interval dynamically. The setting is based upon the actual time that the Management Station establishes contact with the managed device. The goal is to make the watch dog (wd) timer interval large enough to allow the management stations time to establish connections with the managed device. During each dispatch of the discovery task, the longest response from all of the connections in the Management Table is used to calculate an average of the longest timer intervals. The average, plus a buffer, is used as a value for the watch dog timer. The value for the buffer can be set and a value chosen by the implementor, but should be long enough to account for network delays due to errors and/or congestion, and to account for processing time in the device. A safe value of 60 seconds is chosen here to illustrate the concept.

Still referring to FIG. 6, the subroutine for setting the timer interval begins at block 300. In block 300, a temporary working variable termed "timerTemp" is initialized to a value of zero (0). TimerTemp is used to hold the longest connection timer interval during each of the dispatch cycles of the discovery process. The program then descends into block 310 where it retrieves the first entry from the Management Table and gets the connection state, the table time, and the connect time values. The program then descends into block 320 where it checks the connection state of the Management Station. If the connection is true for this entry of the Management Table, then this indicates that a connection was made by the Management Station during the watch dog timer interval. For stations where a connection was established, the time values are used to calculate the new watch dog timer interval (Step 330). If the connection state is false (block 320), then this indicates the connection with the Management Station was lost/broken during the last watch dog timer interval and processing continues in block 325.

Still referring to FIG. 6, in block 325 since it is known that a connection was lost during the last watch dog timer interval, it is assumed that the value of the watch dog timer was not large enough. Therefore, the deltaTime will be set to the last value of the watch dog timer, plus a buffer time of sixty (60) seconds. This value will then get averaged in to increase the new computed value of the watch dog timer. The result is that this discovery process is adapting to the actual connection times made by the Management Station. The processing then continues in block 327 where a check is made to make sure that the deltaTime does not exceed the limit of the maximum value for the watch dog timer that was set in the initial configuration discussed above. This check prevents the adaptive value of the watch dog timer interval from growing indefinitely. If the value of deltaTime is less that wdTimerMax, then processing continues to block 340.

If the value of deltaTime is greater than wdTimerMax, then processing continues in block 329. In block 329, it has been determined that the adaptive value of deltaTime has exceeded the maximum allowed limit of the watch dog timer interval. The value of deltaTime is set to the maximum allowed value for the watch dog timer (wdTimerMax).

Still referring to FIG. 6, in block 330, the deltaTime is calculated by connectTime minus tableTime for this entry in the Management Table. The deltaTime is the point in time from when the tableTime entries were reset and the point in time that the Management Station made the connection with the device. The program then descends into block 340. In block 340, the check is made to determine if the deltaTime that was just calculated is greater than the longest connection timer interval during this dispatch cycle of the discovery process. If the deltaTime is smaller than the longest connection timer interval during this dispatch cycle, then continue to block 360. If the deltaTime is larger than the longest connection timer interval during this dispatch cycle, then continue to block 350 in which the timerTemp value is set to equal the deltaTime. The timerTemp now holds the largest value of the connection timer interval during this dispatch cycle. The program then descends into block 360. In block 360, a check is made to see if all the entries in the Management Table have been processed. If all the Management Tables have been processed, then processing continues to block 370. If additional entries exist in the Management Table, then processing continues in block 410.

Still referring to FIG. 6, in block 370 the wdTimerCount is incremented. The wdTimerCount is a count of the number of dispatch cycles of the discovery process and is used in the calculation of the average watch dog timer value. Processing then continues to block 380. In block 380, the average of the watch dog timer interval is calculated by the following formula:

$$wdTimer=(wdTimer+timerTemp)/wdtimerCount$$

Here the last watch dog timer interval is added to the largest connection timer interval from the current dispatch cycle and then divided by the number of dispatch cycles. The processing then continues to block 390. In block 390, the new watch dog timer value is increased by 60 seconds to account for network. and/or processing delays. This number could be greater or smaller depending on the network configuration, but 60 seconds is arbitrarily used to demonstrate the concept. Processing continues with step 400 in which control is passed back to the polling process, in this case, processing continues with step 68 in FIG. 4A.

Although the foregoing invention has been particularly shown and described with references in the preferred embodiment thereof, it would be understood by those skilled in the art that other changes in form may be made without departing from the spirit and scope of the invention.

We claim:

1. A method for use in a communications network comprising the steps of:
   (a) initiating registration process by sending Discovery frames from a managed device;
   (b) receiving, in said managed device, a management frame indicating discovery of said managed device by a management station;
   (c) setting a timer to run for a particular time interval;
   (d) upon expiration of the time interval, determining if another one of said management frames had been received during the particular time interval;
   (e) if the management frame was not received during the particular time interval, restarting the registration process by resending the Discovery frame wherein the managed device registers with the management station.

2. The method of claim 1 further including the step of:
   (f) repeating steps (c) through (d) if the another one of the management frame is received within the particular timer interval.

3. The method set forth in claim 2 wherein the value of the predetermined timer interval set in step (c) on a first pass through the process steps is substantially the same as in a repeat pass of the process steps.

4. The method of claim 3 wherein the predetermined timer interval is set to be approximately 60 seconds.

5. The method set forth in claim 2 wherein the value of the predetermined timer interval set in step (c) on a first pass through the process steps is different from the values set in a repeat of the process steps.

6. The method of claim 5 wherein different values of the predetermined timer interval are being calculated dynamically.

7. The method of claim 2 further including the step of resetting the timer when the predetermined timer interval expires.

8. A device, for use in a communications network, including:
   a medium access control chip for forwarding and receiving information from the communications network;
   a memory for storing information on at least one process to be used to establish contact or maintain contact with at least one Management Station;
   a Management Table for storing information relative to the at least one Management Station;
   a timer configured to run for a predetermined timer interval; and
   a controller for accessing the memory, generating and delivering to said chip a Discovery frame based upon the stored information and said controller upon receiving a responsive management reply frame from said Management Station setting the timer and upon timer expiration, resending the Discovery frame if another on of the management reply frame has not been received during the timer interval.

9. The device of claim 8 wherein the information includes a first computer program.

10. The device of claim 9 wherein the information includes a second computer program.

11. The device of claim 9 wherein the first computer program includes a machine readable indicia for causing the controller to generate and send, at predetermined timed interval, Auto-Discovery Trap Frames which contain specific information on the device; and
   machine readable indicia for causing said controller to repeat sending said Auto-Discovery frames until the Response Frame indicating that the device has been discovered is received at said controller.

12. The device of claim 8 further including a bus for coupling the controller, the memory and a the medium access control chip.

13. The device of claim 8 wherein the controller includes a microprocessor.

14. The device of claim 8 wherein the management reply frame includes an SNMP Get Request Frame.

15. The method of claim 8 wherein the network includes a TCP/IP network in which SNMP protocols is being used to manage the devices.

16. In a network comprising a plurality of stations interconnected by communications link wherein one or more of said stations are being designated as Management Stations and one or more of said stations are being designated managed devices, a method for operating the network to enable managed devices to be registered with the at least one of the Management Stations, said method comprising the steps of:

(a) generating and transferring from at least one of the managed devices, a Discovery frame including the identity of the at least one managed device;

(b) in response to (a), generating and transmitting, onto the network from at least one of the Management Stations, a notification frame indicating that the at least one of the Management Stations has discovered at least one of the managed devices;

(c) receiving the notification frame in said at least one of the managed devices;

(d) setting a timer configured to run for a predetermined timer interval;

(e) at the end of the timer interval, determining if a second one of the notification frame has been received;

(f) generating and transmitting from said at least one managed device, the Discovery frame including the identity of said at least one managed device if the second notification frame has not been received during the timer interval; and (g) repeating step (f) until the notification frame has been received.

17. The method set forth in claim 16 further including the steps of repeating steps (d) through (e) if the second notification frame has been received during the timer interval.

18. In a network comprising a plurality of stations interconnected by communications link and managed devices wherein one or more of said stations are being designated as Management Stations, a method for establishing and maintaining communication between at least one of the managed devices and at least one of the Management Stations comprising the steps of:

(a) in at least one of the managed devices, generating Discovery frames including the identity of the at least one of the managed devices;

(b) transmitting the Discovery frames until a Response Frame indicating that the at least one of the managed device has been discovered is received from at least one of the management stations;

(c) setting a timer to run for a predetermined timer interval;

(d) at the end of the predetermined timer interval, determining if a second one of the Response Frame has been received during the timer interval;

(e) repeating steps (c) through (d) if the second Response frame was received; and (f) repeating steps (a) through (e) if the Response frame was not received.

19. The method of claim 18 wherein the Response frame includes an SNMP Get Request Frame.

20. The method of claim 18 wherein the Discovery Frame includes an Auto Discovery Trap Frame.

21. The method of claim 18 wherein the Discovery Frame includes a Ping Frame.

22. A computer program product for use in a communications network to establish and maintain communication between Management Stations and managed devices comprising:

a medium;

a computer readable program module recorded on the medium, said computer readable program module causing a computer in at least one of said managed device to generate and send a Discovery frame including the identity of the at least one of the managed device;

a computer readable program module recorded on said medium, for causing a computer in at least one of said managed devices to examine frames received from the Management Station in response to the Discovery frame;

a computer readable program module, recorded on said medium, for causing the computer to set a timer to run for a predetermined timer interval if a Response frame is received;

a computer readable program module, recorded on said medium, for determining if a second one of the Response frame has been received during the timer interval; and a computer readable program module, recorded on the medium, for causing resending of the Discovery Frame if the second of the Response frame has not been received during the time interval.

23. The computer program product of claim 22 further including computer readable program module recorded on said medium for re-setting the timer and monitoring for receipt of the second one of the Response frame if said second one of the Response frame was received during a previous timer interval.

24. A method for use in a communications network comprising the acts of:

(a) receiving, in a managed device, a management frame indicating that the managed device has been discovered by a Management Station;

(b) setting a timer configured to run for a predetermined timer interval;

(c) upon expiration of the timer interval, determining if the another one of the management frame had been received during the timer interval;

(d) if the another one of the management frame had been received, repeat acts (b) through (d);

(e) if the another one of the management frame had not been received, repeat by sending a Discovery frame until the management frame is received.

25. The method of claim 24 wherein the management frame includes an SNMP GET REQUEST frame.

26. The method of claims 24 or 25 wherein the Discovery frame includes a Ping frame.

27. The method of claims 24 or 25 wherein the Discovery frame includes an Auto Discovery Trap frame.

* * * * *